United States Patent [19]

Lane et al.

[11] Patent Number: 4,581,164

[45] Date of Patent: Apr. 8, 1986

[54] GEL DRYING VIA TREATMENT WITH ORGANIC LIQUID BELOW GAS STREAM

[75] Inventors: Edward S. Lane, Didcot; John A. Winter, West Hanney, both of England

[73] Assignee: United Kingdom Atomic Energy Authority, London, England

[21] Appl. No.: 298,337

[22] Filed: Aug. 31, 1981

[30] Foreign Application Priority Data

Sep. 11, 1980 [GB] United Kingdom ............... 8029345

[51] Int. Cl.$^4$ .................. B01J 13/00; G21C 19/46; F26B 3/00

[52] U.S. Cl. .................. 252/635; 252/315.7; 34/36; 34/37

[58] Field of Search .............. 252/317, 634.5, 315.7; 34/36, 37; 264/0.5; 501/85

[56] References Cited

U.S. PATENT DOCUMENTS

| | | | |
|---|---|---|---|
| 2,503,913 | 4/1950 | Kimberlin et al. | 34/9 |
| 2,506,316 | 5/1950 | Pierce | 502/8 |
| 2,746,935 | 5/1956 | Weisz | 34/37 |
| 3,048,929 | 8/1962 | Kremen et al. | 34/36 |
| 3,056,728 | 10/1962 | Ohtaki | 424/34 |
| 4,085,518 | 4/1978 | Jackson et al. | 34/37 |
| 4,140,771 | 2/1979 | Berard | 423/592 X |
| 4,202,793 | 5/1980 | Bezzi | 252/301.1 |
| 4,218,430 | 8/1980 | Biggerstaff | 423/592 X |
| 4,323,381 | 4/1982 | Matsuyama | 252/315.7 |
| 4,349,456 | 9/1982 | Sowman | 252/317 |
| 4,389,385 | 6/1983 | Ramsay | 252/315.7 X |

FOREIGN PATENT DOCUMENTS

| | | |
|---|---|---|
| 624743 | 7/1949 | United Kingdom . |
| 1238053 | 7/1971 | United Kingdom . |
| 1391416 | 4/1975 | United Kingdom . |
| 1419492 | 12/1975 | United Kingdom . |
| 1575300 | 9/1980 | United Kingdom . |

*Primary Examiner*—Edward A. Miller
*Assistant Examiner*—Catherine S. Kilby
*Attorney, Agent, or Firm*—Larson and Taylor

[57] ABSTRACT

The present invention relates to the treatment of gel materials to remove water therefrom. The invention provides a process for removing water from a gel material by contacting the gel material with an organic liquid and contacting the organic liquid with a gas such that water is taken up by the gas. The invention, in one embodiment, may be used to dry gel materials while maintaining an open porous network therein.

15 Claims, No Drawings

GEL DRYING VIA TREATMENT WITH ORGANIC LIQUID BELOW GAS STREAM

IMPROVEMENTS IN OR RELATING TO THE TREATMENT OF MATERIALS

The present invention relates to the treatment of materials and more particularly to the treatment of gel materials to remove water therefrom.

According to one aspect of the present invention a process for removing water from a gel material comprises contacting the gel material with an organic liquid and contacting the organic liquid with a gas such that water is taken up by the gas.

In a preferred embodiment the organic liquid is one capable of extracting water from the gel material such that water is extracted into the organic liquid during contacting thereof with the gel material.

Where the invention is to be used to remove water from a gel material whilst maintaining an open porous network therein it is preferred that the organic liquid is such that it is taken up by the gel material.

The gel material is preferably in a selected physical configuration such as a gel body or bodies. The gel material in accordance with one embodiment of the invention can comprise a plurality of particles (e.g. substantially spherical particles).

It will be appreciated that under most operating conditions organic liquid will also be taken up by the gas. Factors influencing the relative amounts of water and organic liquid taken up include the relative vapour pressures of water and the organic liquid at a given operating temperature. Where an elevated operating temperature is used to increase the rate of water removal from the gel material, it will be understood that, in general, the rate at which organic liquid is taken up by the gas will also increase. Thus, the choice of operating temperature has to take into account such factors as the time required for water removal, the organic liquid used and the rate of loss of organic liquid, a balance being struck to suit given requirements. An elevated operating temperature may be achieved, for example, by (i) heating the organic liquid, or (ii) heating a container containing the gel material and organic liquid, or (iii) using a gas at an elevated temperature or a combination of any two or all of (i) and (ii) and (iii).

Gas which has taken up water can be subsequently treated to remove water therefrom. Where the operating conditions are such that in addition to water, organic liquid is also taken up in substantial quantity by the gas (e.g. as vapour), the gas can be subsequently treated to separate water and organic liquid. Thus, for example, the water and organic liquid can be condensed from the gas. The water and organic liquid separated from the gas can be treated to recover the organic liquid for re-use (e.g. by phase separation or distillation from water).

It will be appreciated that whilst the water (and organic liquid if also taken up) will normally be expected to be present as vapour in the gas after being taken up, it may be that in some circumstances liquid water and organic liquid as such may be entrained in the gas.

The contacting of the organic liquid with the gas may be achieved, for example, by passing gas through the organic liquid (e.g. by bubbling gas through the liquid) or by passing gas around or over the organic liquid.

The contacting of the organic liquid with the gas optionally may be carried out simultaneously with contacting the organic liquid with the gel material or subsequently to contacting the organic liquid with the gel material. The contacting of the organic liquid with the gas may be carried out continuously or intermittantly.

Gases suitable for use in accordance with the present invention include air, nitrogen, argon and carbon dioxide. Factors influencing the choice of gas include cost, inertness to the gel material and to the organic liquid, and the inflammability of the mixture formed when the chosen organic liquid is taken up by the chosen gas.

Any convenient method of contacting the gel material with the organic liquid may be used. Thus, for example, the gel material may be immersed in a bath of the organic liquid or contacted with the organic liquid in a column apparatus. Where the physical form of the gel material permits (e.g. where the gel material comprises a plurality of gel particles) the contacting with the organic liquid can be conveniently effected by suspending, or partially suspending, the gel material in the organic liquid (e.g. gel particles may be subjected to counter-current flow of the organic liquid at a fluidising or sub-fluidising velocity).

For example gel particles can be passed counter-currently to a flow of organic liquid in a column apparatus. The flow and density of the organic liquid is preferably such that the gel particles settle to the bottom of the column apparatus as water is removed to facilitate collection of the particles. Such a column apparatus may be used for a batch operation or the gel particles from which water has been removed may be removed continuously from the column (e.g. by conveying a stream of the organic liquid).

Alternatively the organic liquid may be passed through a static bed of gel bodies.

The present invention may be used for removing water from gel materials produced by a variety of gel processes examples of which are gel precipitation processes, sol-gel processes and internal gelation processes.

The water requiring removal may arise from reagents used in forming the gel material or from washing the gel material with water, for example to remove reagents used in forming the gel material.

Also the present invention finds one application in removing water from gel materials prior to the treating of such materials to form ceramic products.

The formation of ceramic products from gel materials normally involves one or more heating operations. These heating operations can lead to difficulties in obtaining a satisfactory ceramic material.

Thus, gel materials usually contain certain substances which give rise to gaseous products on heating. If these gaseous products are unable to escape satisfactorily the gel materials can be ruptured by release of built up internal pressure.

This can be particularly undesirable where a ceramic product of high integrity, density and uniformity is required. Ceramic microspheres, particularly those for nuclear application such as in nuclear fuel production, are examples of ceramic products which often have to meet rigorous requirements with regard to integrity, internal structure, density and uniformity.

In the case of certain gel materials, for example, those produced by a sol-gel process, the major source of gaseous products on heating can be internally retained water. However, in the case of gel materials produced by a gel precipitation process an important source of gaseous products is the organic gelling agent which decomposes on heating.

In the case of a gel material produced by an internal gelation process important sources of gaseous products on heating are the compounds which arises from the reagent used to effect internal gelation.

As is known in the art the conversion of a gel material produced by a gel precipitation process to a ceramic material involves, inter alia, a heating step to decompose the gelling agent to gaseous products which are removed. This process of removing organic substances is referred to in the gel precipitation art as "debonding". If carbon is not to be removed but is to be retained in the gel material, for example to be utilised for carbide formation, heating will be effected in an atmosphere which whilst permitting the decomposition of organic substances does not lead to the removal of carbon as gaseous products. (In this latter case "debonding" is practised in the sense that organic compounds are decomposed but the carbon produced therefrom is not removed from the gel materials).

Gel materials can be formed with an open porous network. To avoid the aforementioned difficulties with internal pressure it is necessary to ensure that the process used in removing water from the gel material permits retention of an open porous network for the escape of gaseous products.

It has been found that air drying of gel materials can lead to a shrinkage of the open porous network to a point where the aforementioned difficulties of internal pressure are encountered on subsequent heating.

In accordance with one embodiment of the present invention there is provided a process for removing water from a gel material having an open porous network which comprises contacting the gel material with an organic liquid capable of extracting water from the gel material, thereby to extract water from the gel material into the organic liquid, and contacting the organic liquid with a gas such that water is taken up by the gas, the organic liquid and the conditions under which the contacting with the organic liquid is effected being chosen such that the organic liquid permeates the gel material so as to maintain an open porous network as water is extracted and such that an open porous network remains after removal of organic liquid from the gel material.

In one preferred embodiment the gel material comprises a plurality of substantially spherical particles produced by a gel precipitation process.

Thus the present invention may be used, in one embodiment, in the preparation of substantially spherical ceramic particles (e.g. ceramic microspheres) which are not substantially cracked nor broken and therefore have good integrity.

UKAEA British Patent Nos. 1175834, 1231385, 1253807, 1313750 and 1363532 relate to gel precipitation processes and reference should be made to these for information regarding such processes. British Patent No. 1313750 discloses "modifying agents" which can be used in gel precipitation processes (e.g. in the preparation of actinide metal oxide ceramic particles containing uranium oxide and/or plutonium oxide).

Briefly, in the production of a cermaic body by one form of gel precipitation process (known as "forward gel precipitation") a feed solution containing a compound of an element (typically of a metal) and an organic gelling agent, or agents, is introduced into a precipitating agent in a desired physical form (e.g. droplets) to give a gel material in a desired physical configuration (e.g. particles, aggregates, tubes or threads) containing the element. (It will be understood that the element will generally be present in a form of a chemical compound rather than as the free element). It is to be noted that in the gel precipitation art organic gelling agents are sometimes called "gelating agents" or "protective agents". Where appropriate an acidic precipitating agent may be used. A typical precipitating agent is a basic reagent such as ammonium hydroxide. The feed solution may also contain other constituents such as a modifying agent as hereinbefore mentioned. The gel material is subsequently washed with water, treated to debond it and heated to give a ceramic product. If a carbide product is to be formed, carbon may be included in the feed solution and a further carbothermic reduction step effected after debonding. The organic gelling agent enables the feed solution to gel in a coherent manner in the presence of a precipitating agent.

A gel body as formed by the gel precipitation step may be considered as being a coherent structure of controlled shape containing primary particles precipitated from the feed solution and an extended polymer network formed from the gelling agent in the feed solution, the primary particles and the polymer network being arranged to give an open porous network within the gel body.

Conveniently a gel material (such as a plurality of gel particles) is shaken free of loosely adhering water before being contacted with the organic liquid in accordance with the present invention.

The process of the present invention can be carried out so as to remove all extractable water from a gel material, or if desired, only to remove a portion of the water from the gel material (e.g. remove say 25% of the extractable water).

In the latter case the gel material can be subjected to other drying methods as appropriate to the purpose for which the de-watered gel material is to be used. Thus, for example, providing removal of water in accordance with the present invention has been effected to an extent that sufficient open porous network can be maintained after removal of the organic liquid to permit satisfactory escape of gaseous products on debonding, residual water may be removed, together with organic liquid, by air-drying.

It is preferred that the gel material should be substantially inert to the organic liquid (i.e. the organic liquid should not be capable of affecting the gel material adversely by chemical or other reaction).

It is also preferred that the organic liquid has a high flash point. Inflammability dangers may be reduced by the use of inert gases such as argon and nitrogen.

In accordance with the present invention it has been found that it is preferable that the organic liquid has a low solubility in water (i.e. less than 5%). Preferably the solubility is less than or equal to 1%.

Also it is preferred that the organic liquid should have a boiling point substantially above that of water (i.e. a lower volatility than water at a given temperature).

It is preferred that the organic liquid should have a viscosity which permits easy handling (e.g. pumping) and permits gas to pass through without excessive foaming.

Where the organic liquid is one which can be taken up by the gel material it is preferred that the organic liquid is one capable of extracting water from the gel material. In these circumstances it has been found that it is generally sufficient for the organic liquid to have a water saturation content of 1 to 20% by weight. Examples of organic liquids which are capable of extracting water from a gel material are aliphatic alcohols (such as n-hexanol, 2-ethyl-hexanol, ethyl butanol and mixtures of these) and related homologues, amyl alcohol and amines (providing, of course, that the chosen amine does not interact adversely with the gel material).

Examples of organic liquids which may be used in accordance with the present invention, but which do not have any substantial capability of extracting water from the gel material are hydrocarbons (e.g. kerosene) and halogenated hydrocarbons (e.g. trichloroethane and perchloroethane).

Certain other organic liquids such as ketones (e.g. methylisobutyl ketone) can also be used. The suitability of a given organic liquid for use in accordance with the present invention can be readily determined by trial.

The rate at which water is extracted into an organic liquid capable of extracting water can be regulated by adding a pre-determined amount of water (which reduces the effective solubility of water in the organic liquid) or by raising the temperature of the organic liquid (which increases the effective solubility of water in the organic liquid) or by adding organic solutes e.g. such as hydrocarbons (which directly affect the migration of water across the gel/organic liquid interface or alters the diffusivity of water in the organic liquid) or by combinations of these methods.

A surfactant may be introduced into the organic liquid to modify the extraction rate of the water or, in the case where the gel material is gel particles, to help reduce the subsequent aggregation of particles when any excess adhering organic liquid is removed. A wide choice of surfactants is available but preferably the surfactant should be substantially chemically inert to the organic liquid and the gel material, should not cause foaming in the process or in any subsequent organic liquid recovery process and should have some miscibility with the organic liquid.

The rate of water removal from the gel material may be controlled (e.g. by control of gas flow rate) to give a relatively slow rate of water removal at the beginning of the process of removing water followed by a more rapid removal of water at a later stage in the process. Thus, if necessary, "shock drying" may be substantially reduced or avoided.

Organic liquid recovery for re-use can be by distillation or evaporation to remove much of the extracted water. It may be convenient to remove just sufficient water from the organic liquid such that the organic liquid retains the correct amount of water to permit re-use for dewatering gels without further adjustments; in these circumstances partially dried organic liquid may be recirculated for use.

Where the present invention is to be used to remove water from a gel material whilst maintaining an open porous network therein and the organic liquid is such that it is taken up by the gel material it will be appreciated that removal of organic liquid from the gel material can be effected when sufficient water has been removed from the gel material that it is hardened to an extent that the porous network is stabilised.

Organic liquid can be removed from the gel by a number of techniques (e.g. heating).

Whilst the process of removing water from a gel material in accordance with the present invention may be particularly useful in the production of ceramic particles for use as nuclear fuel where it can be important that the particles are free from cracks and surface defects the invention finds application in non-nuclear fields (e.g. in the drying of alumina particles fpr catalytic applications).

Where the present invention is to be used to remove water whilst still maintaining an open porous network in the gel material and the organic liquid is such that it can be taken up by the gel material it is believed, but by no means certain, that the process of the present invention may depend at least in part on the fact that the organic liquid maintains within a gel material surface tension forces which otherwise would be lost on removal of water and thereby permits an open porous network to be retained. It is also believed that the miscibility of water with the organic liquid is a factor influencing the maintenance of the porous network.

The invention also provides in another aspect a gel material from which water has been removed by a process in accordance with the present invention.

Certain gel materials (e.g. those produced by a gel precipitation process) are preferably "conditioned" with water prior to being heated to remove water in accordance with the present invention.

The nature of conditioning is complex and not fully understood, however conditioning does increase the stability of the gel material with respect to maintaining its integrity and consistency of quality during subsequent removal of water. Conditioning in part involves a growth of crystallite size and an increase in the average pore size, and is thought to assist in the stabilising of an open porous network in the gel material. The contacting with water may be achieved for example by contacting the gel material with water as such (preferably at 60° to 100° C.) or contacting with wet steam.

The degree of conditioning required can be determined by experimentation for a particular gel material.

In batch processes in which water is removed from gel materials by contacting with an organic liquid without the use of a gas in accordance with the present invention the minimum volume of organic liquid required is that necessary to accommodate the amount of water which is to be removed from the gel material. The present invention offers the possibility of using a smaller volume of organic liquid since water can be removed continuously or intermittently from the organic liquid by the gas. Organic liquid taken up by the gas can be recovered and recycled.

The invention will now be further described by way of example only as follows (in which Examples 1, 3, 5 to 9 and 11 are examples of removing water from a gel material in accordance with the present invention and Examples 2, 4 and 10 are comparative examples of removing water not in accordance with the present invention):

EXAMPLE 1

5 g of dextran (food quality—obtained from Koch-Light Laboratories) and 1 g of Supercol U (a refined guar gum obtained from Tragasol Products Ltd., Hooton, Cheshire) were dissolved with stirring in 250 ml of water containing 60 g of urea. To the resulting mixture 125 ml of aluminium chlorohydrate were added.

The resulting viscous solution was added dropwise through a 2 mm diameter orifice into 1 liter of 0.880SG ammonium hydroxide solution.

The spheroidal gel particles of gel precipitate thus produced were soaked in the ammonium hydroxide solution for 1 hour then removed and thoroughly washed with cold water.

Water was removed from the gel particles by immersing them for 18 hours in n-hexanol through which air at room temperature was passed at 6 liters/min.

Subsequently the gel particles were removed from the n-hexanol and the n-hexanol evaporated from the gel particles in air at room temperature.

The mercury immersion density of the gel spheres was subsequently determined as being 1.45 g/ml.

EXAMPLE 2

Gel particles were prepared by the same procedure as in Example 1 with the exception that water was not removed therefrom by use of hexanol and air. Instead the gel particles after thorough washing in cold water were air dried by exposure to air at ambient temperature.

The mercury density of the gel spheres thus produced was determined as being 1.95 g/ml.

Comparing the densities obtained in Examples 1 and 2 it can be seen that the gel particles from which water was removed by hexanol and air were more porous than gel particles which were air dried.

EXAMPLE 3

A gel precipitation feed solution was prepared by adding 350 mls of aluminium chlorohydrate solution to 500 mls of a 5% aqueous Wisprofloc P solution. (Wisprofloc P (RTM) is a cationic starch derivative made by W. A. Scholtens' Chemische Fabrieken, NV Holland). This feed solution was added dropwise into 0.880SG ammonium hydroxide solution (the concentration of which was maintained above 12 M during the addition of feed by sparging with ammonia gas). The spheroidal gel particles of gel precipitate thus produced were soaked in the ammonium hydroxide solution for 1 hour then removed, washed with cold water, heated in water to 100° C., allowed to cool and drained.

Water was removed from the gel particles by immersing them for 18 hours in n-hexanol through which a stream of air (room temperature) was passed at 6 liters/min.

Subsequently the gel particles were removed from the n-hexanol and excess n-hexanol removed therefrom by air at room temperature. The gel particles were then heated to 900° C. in air to effect debonding.

The porosity of the resulting particles, calculated from the densities determined by immersion in carbon tetrachloride and in mercury was 0.59 cm$^3$ g$^{-1}$.

These particles were sintered in Ar/4% H$_2$ at 1400°–1450° C. After sintering the particles were of high density and good integrity being substantially free of cracks.

EXAMPLE 4

Gel particles were prepared by the same procedure as Example 3 with the exception that water was not removed therefrom by use of hexanol and air. Instead the gel particles, after being washed, heated in water to 100° C., cooled and drained, were allowed to dry in trays in air at room temperature. The dried gel particles were then heated to 900° C. in air to effect debonding.

The porosity of the resulting material was determined (as in Example 3) to be 0.14 cm$^3$ g$^{-1}$.

Comparing the porosities obtained in Examples 3 and 4 it can be seen that the gel particles from which water was removed by hexanol and air gave a product of greater porosity than the gel particles which were air dried.

This demonstrates that porosity resulting from removing water from the gel particles in accordance with the present invention is retained after debonding.

The resulting debonded particles were sintered in Ar/4% H$_2$ as in Example 3. The resulting sintered particles were cracked, misshapen or broken in contrast with the sintered particles obtained in Example 3.

EXAMPLE 5

Using aluminium chlorohydrate and Catogel 1063 (as a gelling agent) gel particles (~3 mm diameter) comprising gel precipitated aluminium hydroxide were prepared in accordance with BP No. 1231 385 (UKAEA). (Catogel 1063 (Trade Mark) is a cationic starch manufactured by Laing National Ltd., Manchester England).

330 ml of the gel particles were heated in boiling water for 1 hour, drained and contacted with 1 l of n-hexanol.

Air was passed through the n-hexanol containing gel particles at a flow rate of 4 liters/min whilst the temperature of the n-hexanol was held between 50°–60° C.

Vapours evolved were passed through a glass water condenser and recovered.

After 6 hours the distillate comprised 65 ml n-hexanol and 95 ml water.

The gel particles were drained (820 ml n-hexanol were recovered) and remaining n-hexanol evaporated from the gel particles in a stream of air at room temperature.

The resulting gel particles from which water had been removed were subsequently heated in air to 700° C. to give a particulate product of good integrity free from cracks.

EXAMPLE 6

80 mls of aluminium chlorohydrate (Albright & Wilson Ltd., Toiletries grade) was mixed with 200 mls of Catogel 1063 solution. (Catogel 1063 (RTM) is a cationic starch manufactured by Laing National Ltd., Manchester, England). The resulting mixture was used to form a gel precipitate in accordance wLth BP 1,231,385 (UKAEA).

The resulting gel particles were washed, boiled in water for 1 hour and contacted with n-hexanol through which air was passed. The n-hexanol was heated and warm air used such that the temperature was maintained at ~60° C. during the water removal. The process was continued until no more water was evolved. Hexanol was removed from the resulting particles in a stream of air at 60° C. and subsequently the particles were heated in air to 700° C. to give substantially spherical crack-free particles of 0.97 mm diameter having an average crushing strength of 1.16 Kg.

EXAMPLE 7

Gel precipitated spheres containing uranium and plutonium (30% Pu/ 70% U) were prepared in accordance with known gel precipitation procedures (BP No. 1363532). The resulting spheres were washed, in warm water (60° C.) for 1 hour and subsequently were treated in wet steam at 100° C. for 2 hours. The spheres were then placed in a glass column and surrounded by n-hexanol liquid. Nitrogen gas was blown through a frit at the base of the glass column so as to bubble through the n-hexanol. The nitrogen flow rate was 3 liters/min and the bed depth of spheres was 100 mm. After treatment for a period of 4–5 hours the n-hexanol was drained off and the nitrogen flow rate was raised to 10 liters/min to remove remaining n-hexanol overnight.

The resulting dewatered spheres were examined for density, pore volume and integrity before debonding and sintering to ceramic oxide spheres. The geometric density of the dewatered spheres was 0.8 g cm$^{-3}$ and the pore volume was 1.0 cm$^3$ g$^{-1}$. The spheres were wholly uncracked and of good shape.

EXAMPLE 8

The procedure of Example 7 was followed with the exception that the 2 hours wet steam treatment was omitted. The resulting dewatered spheres were uncracked and of good shape. The geometric density was 1.2 g cm$^{-3}$ and the pore volume 0.7 cm$^3$ g$^{-1}$.

EXAMPLE 9

The procedure of Example 7 was followed with the exception that the heavy metal content was 30% Th and 70% U. The spheres were steam pre-treated as in Example 7 and then dried as in Example 7. The resulting gel sphere product was of excellent crack free integrity and good shape and porosity. The geometric density was 0.85 g cm$^{-3}$ and the pore volume 0.91 cm$^3$ g$^{-1}$.

EXAMPLE 10

Gel particles of ~3 mm diameter was prepared in accordance with BP 1231385 (UKAEA) using a feed solution comprising aluminium chlorohydrate (100 ml; 0.31 g Al$_2$O$_3$/ml) mixed with a 10% (by weight) aqueous solution of Staragel (200 ml). (Staragel (Registered Trade Mark) is an edible starch marketed by Laing National Ltd. Trafford Park, Manchester, England).

A 50 ml sample of the gel particles was tray dried in air at ambient temperature for 3 days.

The dried gel particles thus produced had a diameter of 1730 μm.

EXAMPLE 11

A 50 ml sample of gel particles produced as described in Example 10 were drained of surplus water and dewatered by being immersed in odourless kerosene through which air at ambient temperature was passed at 6 l.min$^{-1}$. The drying was continued for 3 days at which time the dewatered gel particles were freely suspended in the kerosene and were not clumped together.

The dewatered gel particles were drained of residual kerosene and were shown to have a diameter of 2840 μm.

Residual kerosene was removed from the dewatered gel spheres by exposure to air in trays at ambient temperature.

The resulting particles are shown to have a diameter of 1770 μm.

We claim:

1. A process for removing water from a pre-formed, wet gel material having an open porous network which comprises contacting a pre-formed, wet gel material with an organic liquid, the amount of organic liquid being sufficient to immerse the organic material therein, contacting the organic liquid with a gas such that water from the gel and present in the organic liquid is taken up by the gas, the organic liquid and the conditions under which the contacting of the pre-formed, wet gel with the organic liquid and the contacting of the organic liquid with the gas are effected being chosen such that the organic liquid permeates the gel material so as to maintain an open porous network in the gel material as water is taken up by the gas and such that an open porous network remains after removal of organic liquid from the gel material, and removing the organic liquid from the gel to provide a gel having an open porous network.

2. A process according to claim 1 wherein said organic liquid is one which is capable of extracting water from the gel material.

3. A process according to claim 2 wherein said organic liquid has a water saturation content of from 1 to 20%.

4. A process according to claim 1 wherein contacting the pre-formed gel material with said organic liquid comprises immersing the gel material in the organic liquid.

5. A process as claimed in claim 1 wherein the gel material comprises a plurality of particles of gel material.

6. A process as claimed in claim 1 wherein the contacting of the organic liquid with the gas is achieved by passing gas through the organic liquid or by passing gas around or over the organic liquid.

7. A process as claimed in claim 6 wherein the gas is selected from the group consisting of air, nitrogen, argon and carbon dioxide.

8. A process as claimed in claim 1 wherein the gel material comprises a plurality of gel particles and the contacting with the organic liquid is effected by suspending, or partially suspending, the particles in the organic liquid.

9. A process as claimed in claim 1 wherein the organic liquid has a solubility in water of <5%.

10. A process as claimed in claim 9 wherein the organic liquid has a solubility in water of ≦1%.

11. A process as claimed in claim 1 wherein the organic liquid has a boiling point substantially above that of water.

12. A process as claimed in claim 1 wherein the organic liquid is capable of extracting water from the gel material and is selected from the group consisting of aliphatic alcohols and amines.

13. A process as claimed in claim 1 wherein the organic liquid is selected from the group consisting of hydrocarbons and halogenated hydrocarbons.

14. A process as claimed in claim 1 wherein the gel material is conditioned with water prior to the removing of water from the gel material.

15. A process as claimed in claim 1 wherein the gel material has been produced by a gel precipitation process, a sol-gel process or an internal gelation process.

* * * * *